(12) United States Patent
Inamoto

(10) Patent No.: US 6,618,213 B2
(45) Date of Patent: Sep. 9, 2003

(54) ROTARY OPTICAL FILTER APPARATUS INTEGRATED WITH COOLING FAN AND ILLUMINATION OPTICAL SYSTEM

(75) Inventor: Masayuki Inamoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/279,869

(22) Filed: Oct. 25, 2002

(65) Prior Publication Data

US 2003/0095349 A1 May 22, 2003

(30) Foreign Application Priority Data

Nov. 20, 2001 (JP) .......................................... 2001-354909

(51) Int. Cl.$^7$ ................................................. G02B 5/22
(52) U.S. Cl. ..................... 359/889; 359/891; 359/885; 362/373; 362/322; 353/84; 348/743; 348/748
(58) Field of Search ................................. 359/889, 891, 359/892, 885; 362/373, 322, 323, 282; 353/84; 348/748, 743, 835

(56) References Cited

U.S. PATENT DOCUMENTS 4,704,660 A * 11/1987 Robbins ...................... 362/294

FOREIGN PATENT DOCUMENTS

| JP | 07-264605 | * 10/1995 |
| JP | 2001-100315 | * 4/2001 |
| JP | 2001-142146 | * 5/2001 |

* cited by examiner

*Primary Examiner*—John Juba
*Assistant Examiner*—Leo Boutsikaris
(74) *Attorney, Agent, or Firm*—Snider & Associates; Ronald R. Snider

(57) ABSTRACT

A rotary optical filter apparatus containing an optical filter is integrated with a sirocco type cooling fan having a plurality of fan blades. The cooling fan is supported by a rotary holder of the optical filter apparatus so as to be integrally rotatable with the optical filter. The cooling fan inhales an air from its center part and discharges thus inhaled air from its outer peripheral part due to an action of the fan blades upon rotating, so as to make an airflow along the filter face and cool the optical filter.

7 Claims, 4 Drawing Sheets

ROTARY OPTICAL FILTER APPARATUS INTEGRATED WITH COOLING FAN AND ILLUMINATION OPTICAL SYSTEM

RELATED APPLICATIONS

This application claims the priority of Japanese Patent Application No. 2001-354909 filed on Nov. 20, 2001, which is incorporated herein by reference.

BACKGROUND OF THE INVENTION

1. Field of the Invention

The present invention relates to a rotary optical filter apparatus arranged within an optical path in an illumination optical system of a projection type image display apparatus or the like, for example, in order to change the color of illumination light periodically; and, more specifically, to a rotary optical filter apparatus integrated with a cooling fan, comprising a fan for cooling an optical filter, and an illumination optical system using the same.

2. Description of the Prior Art

Color wheel apparatus employed as color separating means have been known in illumination optical systems of projection type image display apparatus for optically modulating illumination light by image display devices such as liquid crystal display and digital micromirror device (hereinafter referred to as "DMD") and projecting thus modulated light under magnification. A color wheel apparatus comprises a disk-shaped optical filter rotated at a high speed by the driving force of an electric motor or the like, whereas the optical filter is divided into a plurality of regions along its circumferential direction. Further, each of thus divided regions is processed so as to exhibit a predetermined optical characteristic, for example, by vapor deposition of a multilayer film such as dichroic film.

While rotating, the optical filter is continuously irradiated with a light beam outputted from a light source, thereby being heated considerably.

Recently, projection type image display apparatus have been desired to project images with higher luminance and make the apparatus smaller, whereby the output of the light source light has been made greater while the color wheel apparatus have been made smaller. As the color wheel apparatus have been made smaller, the diameter of the luminous flux from the light source for irradiating the optical filter has been made further smaller, whereby the amount of irradiation per unit area of the optical filter has increased. As the output of the light source light has further increased, the extent to which the optical filter is heated has increased remarkably.

As a consequence, the moisture existing in the multilayer film deposited on the optical filter may be released, for example, thus yielding the possibility of the optical filter failing to keep a predetermined optical characteristic. For keeping a predetermined optical characteristic, an optical filter excellent in heat resistance may be used. However, such an optical filter is so expensive that the manufacturing cost may increase when it is used.

For preventing optical characteristics of an inexpensive filter from deteriorating, a fan for cooling the optical filter may be provided so as to suppress the heating. However, newly providing a fan for cooling the optical filter necessitates not only the fan but also an electric motor for driving the fan, whereby a space for installing them and the resulting increase in mass may become problematic.

Japanese Unexamined Patent Publication No. 2001-100315 discloses an apparatus in which a filter face of a color wheel apparatus is provided with blades, so that cooling winds are generated as the color wheel rotates. It is advantageous in that no driving motor for the fan is necessary since the color apparatus itself acts as a cooling fan. However, this color wheel apparatus is configured just for cooling a video display device. Providing only the blades having the configuration as disclosed is hardly effective in cooling the color wheel itself, and is hard to guide cooling winds to other places.

SUMMARY OF THE INVENTION

In view of the foregoing circumstances, it is an object of the present invention to provide a rotary optical filter apparatus integrated with a cooling fan, equipped with a fan function for effectively cooling an optical filter, preventing the optical filter from overheating, and making inexpensive filters usable without deteriorating their optical characteristics; and an illumination optical system using the same.

For overcoming the problems mentioned above, the present invention provides a rotary optical filter apparatus integrated with a cooling fan, comprising a rotary holder axially supported with respect to a predetermined rotary axis; and an optical filter having a filter face formed so as to exhibit a predetermined optical characteristic, the optical filter being rotated together with the rotary holder while being held by the rotary holder such that the filter face is substantially orthogonal to the rotary axis; wherein the cooling fan is a sirocco type cooling fan comprising a plurality of fan blades, each having a wing-shaped cross section extending radially of the rotary axis, arranged circumferentially of the rotary axis at respective positions outwardly separated from the rotary axis, the cooling fan being supported by the rotary holder so as to be integrally rotatable with the optical filter, the cooling fan inhaling an air from a center part and discharging thus inhaled air from an outer peripheral part due to an action of the fan blades upon rotating, so as to make an airflow along the filter face and cool the optical filter.

The fan blades may be forwardly inclined by a predetermined angle in the rotating direction. This enhances the effect of directing the airflow to the filter face.

The rotary optical filter apparatus may further comprise a fan cover having a housing for covering the rotary holder, optical filter, and cooling fan, the housing being formed with an intake port for taking an air therein from outside and an exhaust port for blowing the air discharged by the cooling fan into a predetermined direction in a centralized manner.

When the optical filter is a transmission type optical filter, the housing may be formed with an entrance opening for making a luminous flux from a light source section incident on the optical filter within the housing and an exit opening for discharging from the housing the luminous flux transmitted through the optical filter, each of the entrance and exit openings having a light-transmitting sheet attached thereto.

The optical filter may be an optical filter decomposing a white luminous flux from a light source section into three colors of R, G, and B in a time-division manner and outputting thus decomposed color light components.

The present invention provides an illumination optical system for outputting light from a light source section as predetermined illumination light, the illumination optical system comprising the rotary optical filter apparatus integrated with a cooling fan in accordance with the present invention.

The illumination optical system may comprise the rotary optical filter apparatus integrated with a cooling fan in accordance with the present invention in which the optical filter is an optical filter decomposing a white luminous flux from a light source section into three colors of R, G, and B in a time-division manner and outputting thus decomposed color light components, and a digital micromirror device irradiated with the luminous flux outputted by the optical filter as being decomposed into the three colors in the time-division manner.

DESCRIPTION OF THE PREFERRED EMBODIMENTS

In the following, embodiments of the rotary optical filter apparatus integrated with a cooling fan in accordance with the present invention and the illumination optical system using the same will be explained in detail with reference to the drawings.

Figure 4:
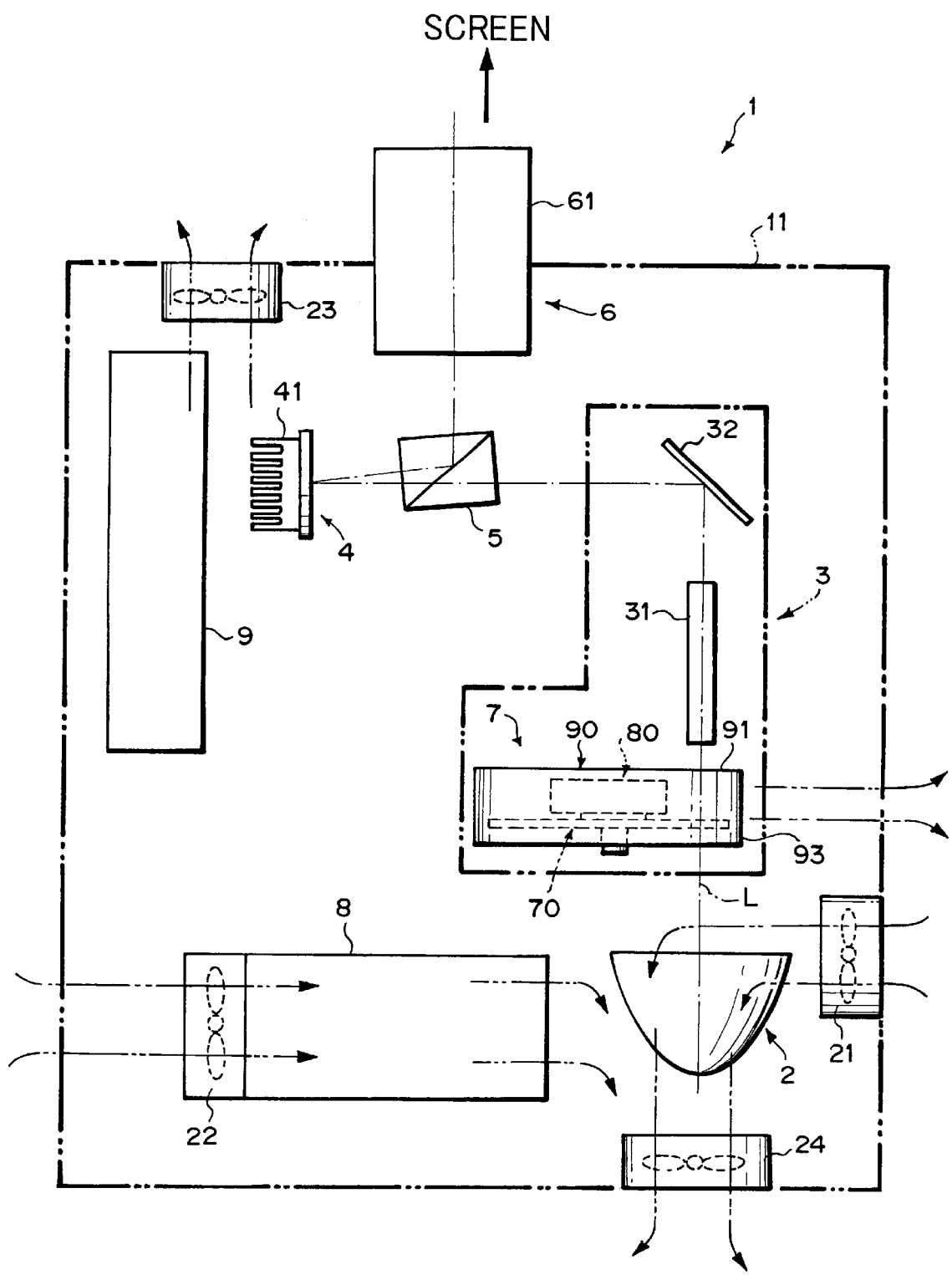
FIG. 4 is a schematic view of a projection type image display apparatus comprising the apparatus shown in FIG. 1.

FIG. 4 is a schematic view showing the configuration of a video projector comprising the rotary optical filter apparatus integrated with a cooling fan in accordance with an embodiment of the present invention. Here, the arrows of dash-double-dot lines in the drawing roughly indicate airflows.

The video projector 1 shown in FIG. 4 is a typical projection type image display apparatus, and comprises a light source section 2, an illumination optical system 3, an image display means 4, an optical prism 5, and a projection lens system 6 arranged in the direction of optical axis L within its projector housing 11.

The illumination optical system 3 comprises a color wheel apparatus 7 (which will be explained later in detail) as an embodiment of the optical filter apparatus integrated with a cooling fan for decomposing a white luminous flux from the light source section 2 into three colors of R, G, and B in a time-division manner, a rod integrator 31 for homogenizing the density of color-decomposed luminous flux, and a reflecting mirror 32 for reflecting thus density-homogenized luminous flux toward the image display means 4. Also, the illumination optical system 3 comprises other optical devices such as relay lens (not depicted), and is configured so as to convert the luminous flux incident thereon from the light source section 2 into illumination light and emit the latter toward the image display means 4.

Employed as the image display means 4 is a DMD (digital micromirror device), for example. The DMD comprises a mirror face in which a very large number of (about 0.5 to 0.8 million) mirror devices (each being an aluminum mirror having a rectangular form) are arranged, and is configured such that respective reflecting directions of the individual mirror devices constituting the mirror face are independently switchable between two directions (forming a narrow angle of about 20° to 24° therebetween). This switching of reflecting directions is carried out by on/off control of image signals (video signals) fed into the DMD while using the individual mirror devices as pixels. Under this control, the image display means 4 converts the illumination light incident thereon from the illumination optical system into image display light carrying image information and emit it toward the optical prism 5.

Though not depicted, the projection lens system 6 comprises a plurality of lenses arranged in series on the optical axis L within the lens barrel 61, and a lens moving mechanism for moving the plurality of lenses in the direction of optical axis L so as to change the focal length, thereby being able to alter the image magnification, projection length, and the like. The projection lens system 6 is configured so as to project toward an image projection surface (screen) the incident image display light reflected by the optical prism 5 after being emitted from the image display means 4.

The video projector 1 also comprises a light source power supply 8 arranged near the light source section 2 on the left side thereof in the drawing and a circuit board 9 arranged near the image display means 4 on the left side thereof in the drawing. Each of the light source section 2 and the light source power supply 8 becomes a heat source. An intake fan 21 for taking in the air from outside the projector housing 11 and blowing it toward the light source section 2 is disposed near the light source section 2 on the right side in the drawing. An intake fan 22 for taking in the air from outside the projector housing 11 and blowing it toward the light source power supply 8 is disposed near the light source power supply 8 on the left side in the drawing.

Each of the image display means 4 and circuit board 9 may malfunction when overheated. Therefore, the image display means 4 is provided with a cooling fin 41, whereas an exhaust fan 23 for causing the air within the projector housing 11 to flow near the image display means 4 and circuit board 9 and then exit from the projector housing 11 is disposed near the display means 4 and circuit board 9 on the front side in the drawing. Further provided near the light source section 2 on the rear side in the drawing is an exhaust fan 24 for causing the air taken into the projector housing 11 by the intake fans 21, 22 to flow near the light source section 2 and light source power supply 8 and then exit from the projector housing 11. Though not depicted, the projector housing 11 is formed with respective openings near the fans 21, 22, 23, 24 for allowing air communication between the inside and outside thereof.

The color wheel apparatus 7 will now be explained in detail with reference to the drawings.

Figure 1:
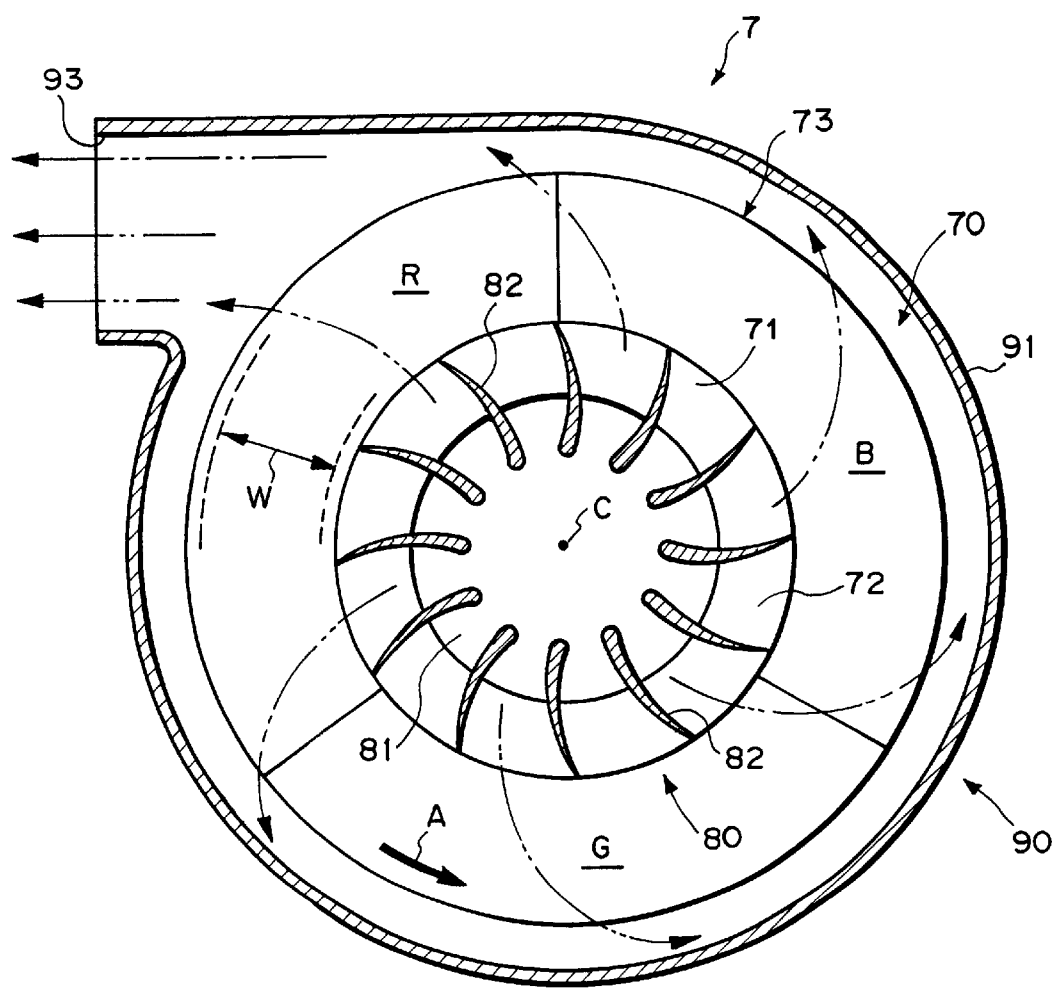
FIG. 1 is a sectional view of the apparatus in accordance with an embodiment of the present invention taken along a direction perpendicular to the optical axis.
Figure 2:
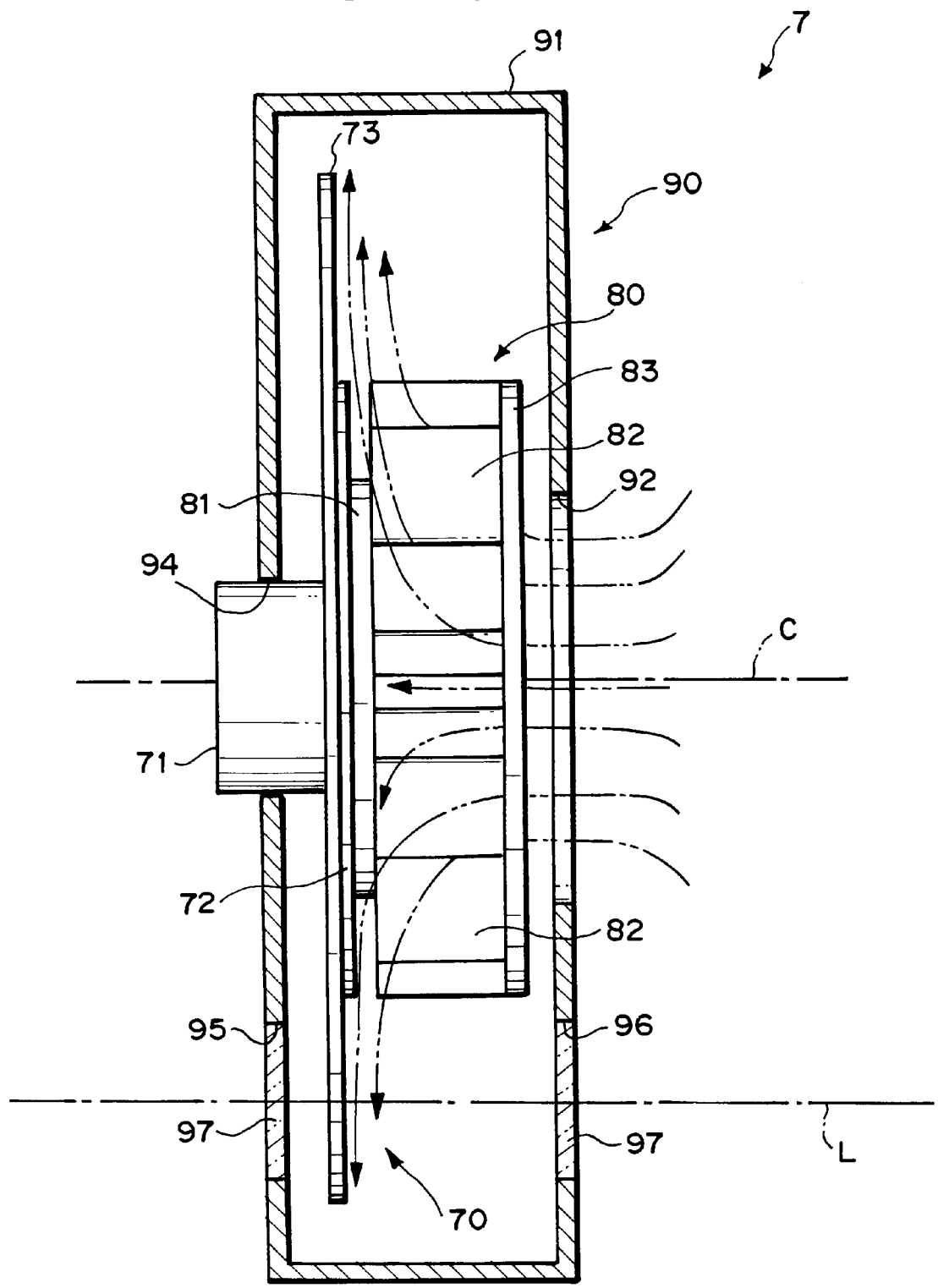
FIG. 2 is a sectional view of the apparatus shown in FIG. 1 taken along the optical axis direction.
Figure 3:
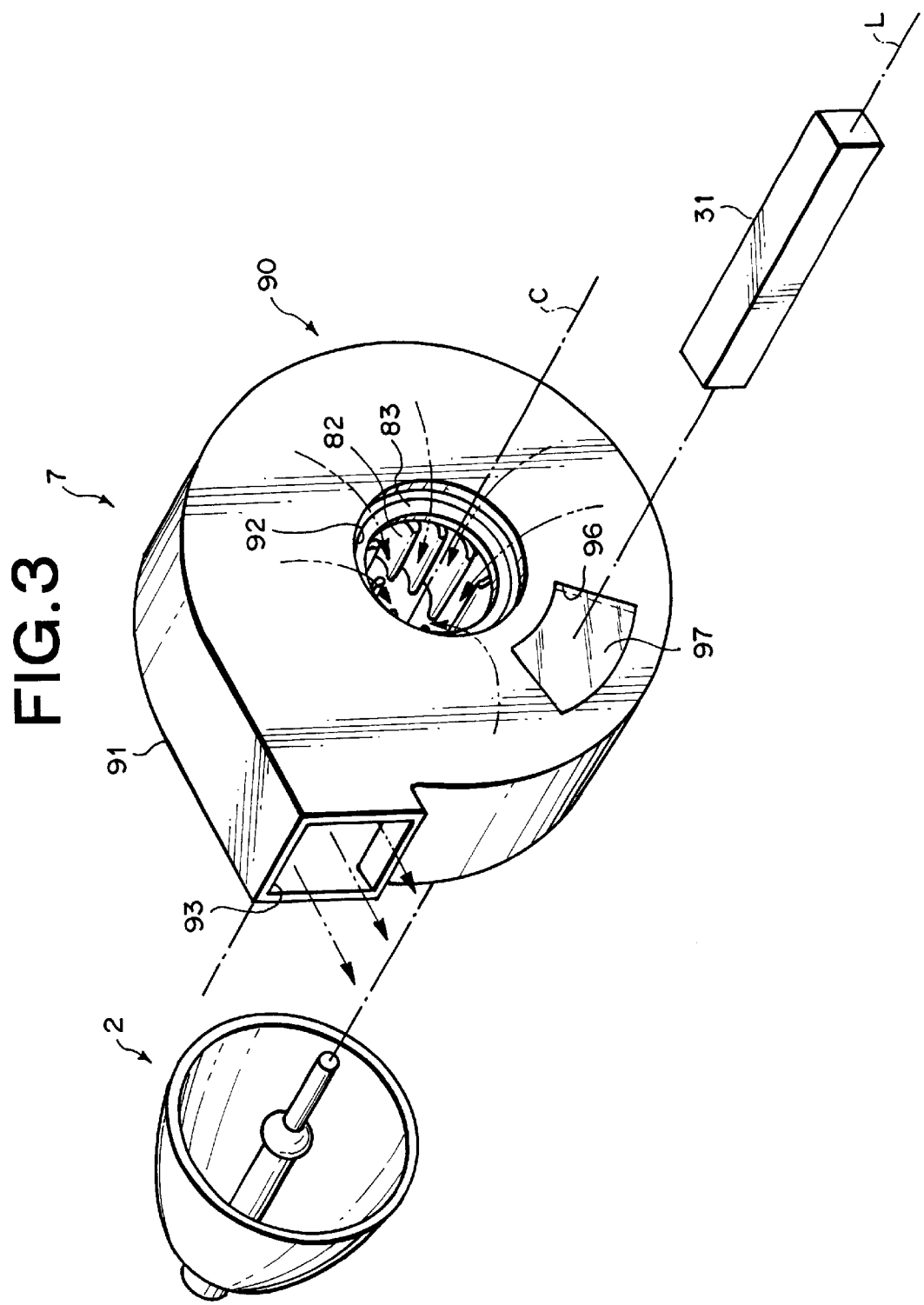
FIG. 3 is a perspective view of the exterior of the apparatus shown in FIG. 1.

FIG. 1 is a sectional view showing the configuration of a main part of the color wheel apparatus 7 taken along a direction perpendicular to the optical axis, FIG. 2 is a partly sectional view taken along the optical axis direction, and FIG. 3 is a perspective view showing the exterior thereof. The arrows of dash-double-dot lines in the drawings roughly indicate airflows.

The color wheel apparatus 7 is a transmission type color wheel apparatus which color-decomposes the white luminous flux passing therethrough outputted from the light source section 2 in a time-division manner. As shown in FIG. 2 in detail, it comprises a color wheel main unit 70, a sirocco fan 80 integrally attached to the color wheel main unit 70, and a fan cover 90 covering the color wheel main unit 70 and sirocco fan 80.

The color wheel main unit 70 comprises an electric motor 71, a support disk 72 axially supported by an unshown rotor of the electric motor 71, and a disk-shaped optical filter 73 secured to the support disk 72 with an adhesive or the like.

The driving force of the electric motor 71 rotates the optical filter 73 together with the support disk 72 about a rotary axis C extending in parallel with the optical axis L.

As shown in FIG. 1, the optical filter 73 is formed with three filter regions consisting, for example, of a red light transmitting region R, a green light transmitting region G, and blue light transmitting region B for respectively transmitting therethrough only red, green, and blue light components in the white luminous flux from a light source. Each of the filter regions R, G, and B has a sectored form obtained when a circle is radially divided into three equal parts, whereas an area excluding outer and inner peripheral end parts thereof forms an optically effective area W.

The respective optical characteristics of the filter regions R, G, and B are obtained by a commonly known method such as one depositing onto their surfaces dichroic films adapted to reflect or transmit only their corresponding primary color light components.

The sirocco fan 80 comprises a disk-shaped bottom plate 81 attached to the support disk 72 of the color wheel main unit 70 by bonding or screwing, a plurality of (e.g., 12) fan blades 82 rising in the direction of rotary axis C from the bottom plate 81, and a ring-shaped top plate 83 disposed on the opposite side of the fan blades 82 from the bottom plate 81 in the direction of rotary axis C.

As shown in FIG. 1, the fan blades 82, each having a wing-shaped cross section extending radially of the rotary axis C, are disposed at substantially equally-spaced intervals circumferentially of the rotary axis C at their corresponding positions separated from the rotary axis C by a predetermined distance. The outer diameter of the bottom plate 81 is slightly smaller than the inner ring diameter of the top plate 83, so that the bottom plate 81 appears to be accommodated within the inner ring of the top plate 83 when seen from the top plate 83 side in the direction of rotary axis C, i.e., they do not overlap each other in the vertical direction. Therefore, the bottom plate 81, fan blades 82, and top plate 83 can be formed by integral molding with a plastic resin.

Thus configured sirocco fan 80 is integrally rotated with the optical filter 73 due to the driving force of the electric motor 71. During the rotation, the air is inhaled from the center part (inner ring part of the top plate 83) due to the action of the fan blades 82, and thus inhaled air is discharged from the outer peripheral part while being outwardly pushed by the respective faces of the fan blades 82. For enhancing the action of directing airflows to the optical filter 73, each fan blade 82 may be forwardly inclined by a predetermined angle in the rotating direction A.

The fan cover 90 comprises a cover housing 91 for covering the color wheel main unit 70 and sirocco fan 80, whereas the cover housing 91 is formed with an intake port 92 for taking in the air from outside the cover housing 91 and an exhaust port 93 for blowing out the air discharged by the sirocco fan 80 into a predetermined direction in a centralized manner. Also, as shown in FIG. 2, the cover housing 91 is formed with a motor opening 94 for exposing a part of the electric motor 71, an entrance opening 95 for making the luminous flux from the light source section 2 incident on the optical filter 73 within the cover housing 91, and an exit opening 96 for letting out the luminous flux transmitted through the optical filter 73. Transparent glass sheets 97 for preventing air from communicating through the entrance opening 95 and exit opening 96 while transmitting therethrough the white luminous flux from the light source section 2 are attached to the openings 95, 96.

As shown in FIG. 3, the fan cover 90 is arranged such that the optical axis L passes through the entrance opening 95 (not depicted in FIG. 3) and exit opening 96 of the cover housing 91. Here, the intake port 92 is directed to the front side of the video projector 1, whereas the exhaust port 93 is directed to the right side thereof (see FIG. 4). Due to the action of the sirocco fan 80 integrally rotating with the color wheel main unit 70 within the cover housing 91, the air taken into the sirocco fan 80 through the intake port 92 from the outside of the cover housing 91 and then discharged from the sirocco fan 80 so as to cool the optical filter 73 is blown out through the exhaust port 93 toward the right side of the video projector 1.

The air discharged from the exhaust port 93 in a centralized manner is let out of the projector housing 11 by way of an unshown opening formed in the projector housing 11. This airflow, together with the other fans 21, 22, 23, 24 placed within the projector housing 11, causes the air within the projector housing 11 to circulate, thereby functioning to prevent heat from accumulating within the projector housing 11 as well. The exhaust port 93 may be formed so as to be directed to other heat source parts such as the light source section 2, so that the air discharged from the exhaust port 93 is more actively utilized for cooling these heat source parts.

In thus configured color wheel apparatus 7, the support disk 72, optical filter 73, and sirocco fan 80 are integrally rotated by the driving force of the electric motor 71, whereby the white luminous flux incident on the illumination optical system 3 from the light source section 2 is decomposed into individual color light components in a time-division manner by the optical filter 73.

Here, due to the rotating action of the sirocco fan 80, the air is taken from the outside of the cover housing 91 into the inside of the sirocco fan 80 by way of the intake port 92, and then is discharged from the sirocco fan 80, so as to cool the optical filter 73, before being blown out of the cover housing 91 in a centralized manner through the exhaust port 93. Consequently, the irradiating white luminous flux is prevented from overheating the optical filter 73.

The white luminous flux incident on the illumination optical system 3 from the light source section 2 is color-decomposed by the color wheel apparatus 7 in a time-division manner and, after the luminous flux density is homogenized by the rod integrator 31, is emitted from the illumination optical system 3 to the image display means 4 by way of the reflecting mirror 32.

The illumination light incident on the image display means 4 after being emitted from the illumination optical system 3 is converted by the image display means 4 into image display light carrying image information, and then is emitted toward the optical prism 5. The image display light emitted from the image display means 4 is reflected by the optical prism 5 so as to be made incident on the projection lens system 6, and is emitted toward an unshown image projection surface (screen) from the projection lens system 6 by way of lens groups within the lens barrel 61, whereby a projection image is projected onto the image projection surface.

Though an embodiment of the rotary optical filter apparatus integrated with a cooling fan in accordance with the present invention is explained in the foregoing, it can be modified in various manners without being restricted to the above-mentioned embodiment.

For example, a fan cover is provided together with the sirocco type cooling fan in the above-mentioned embodiment. The fan cover is effective in the case where the air within the video projector is to be circulated efficiently, or in the case where the airflow produced by a sirocco type cooling fan is utilized for cooling other heat source parts at the same time. The function of cooling the optical filter is sufficiently achieved by the sirocco type cooling fan alone, whereby the fan cover may be omitted.

The fan cover housing in the above-mentioned embodiment is formed with an entrance opening for making the luminous flux from the light source section incident on the optical filter within the cover housing, and an exit opening for emitting the luminous flux transmitted through the optical filter to the outside of the cover housing, whereas transparent glass sheets for preventing air from communicating through the entrance and exit openings while transmitting therethrough the white luminous flux from the light source section are attached to the entrance and exit openings. However, the entrance and exit openings will not be necessary in particular if the cover housing itself is formed from a transparent member or if intake and exhaust ports for air communication are disposed at positions corresponding to the entrance and exit openings so as to be usable as these openings as well.

Though the above-mentioned embodiment uses a transmission type color wheel, it may be a reflection type color wheel in which three regions corresponding to respective primary colors are formed with dichroic films reflecting only their corresponding primary colors.

The color wheel apparatus in the present invention is not restricted to one having three equally-divided regions for transmitting or reflecting the respective primary color light components. It may have four or more divided regions. Any of the regions may be formed wider or narrower. It may be formed with a region for transmitting or reflecting white light or color light obtained by mixing two of the three primary color light components.

The use of the optical filter apparatus integrated with a cooling fan in accordance with the present invention is not limited to the color wheel apparatus. It is also applicable to apparatus equipped with an optical filter for changing other elements such as the brightness of light from the light source instead of decomposing it into color light components. It is similarly applicable to cases where the optical filter is constituted by a plurality of members or a single member.

The illumination optical system using the optical filter apparatus integrated with a cooling fan is usable not only for the above-mentioned video projector, but also for various optical instruments using a rotary optical filter apparatus.

In the optical filter apparatus integrated with a cooling fan and illumination optical system in accordance with the present invention, as explained in detail in the foregoing, a sirocco type cooling fan comprising a plurality of fan blades, each having a wing-shaped cross section extending radially of the rotary axis, arranged circumferentially of the rotary axis at respective positions outwardly separated from the rotary axis, the cooling fan being supported by the rotary holder so as to be integrally rotatable with the optical filter, the cooling fan inhaling an air from a center part and discharging thus inhaled air from an outer peripheral part due to an action of the fan blades upon rotating, so as to make an airflow along the filter face and cool the optical filter.

Since the sirocco type cooling fan is disposed as mentioned above, airflows for cooling the optical filter can be produced efficiently. As a consequence, the optical filter can be prevented from overheating, whereby stable optical performances can be obtained even when using an inexpensive optical filter whose optical performances may deteriorate upon overheating. Also, since the cooling fan is driven by an electric motor for rotating the optical filter, no additional electric motor is necessary, which, along with the usability of inexpensive optical filters, makes it possible to restrain the total cost of the product from rising.

What is claimed is:

1. A rotary optical filter apparatus integrated with a cooling fan, said rotary optical filter comprising a rotary holder axially supported with respect to a predetermined rotary axis; and an optical filter having a filter face formed so as to exhibit a predetermined optical characteristic, said optical filter being rotated together with said rotary holder while being held by said rotary holder such that said filter face is substantially orthogonal to said rotary axis;

wherein said cooling fan is a sirocco type cooling fan comprising a plurality of fan blades, each having a wing-shaped cross section extending radially of said rotary axis, arranged circumferentially of said rotary axis at respective positions outwardly separated from said rotary axis, said cooling fan being supported by said rotary holder so as to be integrally rotatable with said optical filter, said cooling fan inhaling an air from a center part and discharging thus inhaled air from an outer peripheral part due to an action of said fan blades upon rotating, so as to make an airflow along said filter face and cool said optical filter.

2. A rotary optical filter integrated with a cooling fan according to claim 1, wherein said fan blades are forwardly inclined by a predetermined angle in said rotating direction.

3. A rotary optical filter integrated with a cooling fan according to claim 1, further comprising a fan cover having a housing for covering said rotary holder, optical filter, and cooling fan, said housing being formed with an intake port for taking an air therein from outside and an exhaust port for blowing said air discharged by said cooling fan into a predetermined direction in a centralized manner.

4. A rotary optical filter integrated with a cooling fan according to claim 3, wherein said optical filter is a transmission type optical filter, said housing being formed with an entrance opening for making a luminous flux from a light source section incident on said optical filter within said housing and an exit opening for discharging from said housing said luminous flux transmitted through said optical filter, each of said entrance and exit openings having a light-transmitting sheet attached thereto.

5. A rotary optical filter integrated with a cooling fan according to claim 1, wherein said optical filter is an optical filter decomposing a white luminous flux from a light source section into three colors of R, G, and B in a time-division manner and outputting thus decomposed color light components.

6. An illumination optical system for outputting light from a light source section as predetermined illumination light, said illumination optical system comprising the rotary optical filter apparatus integrated with a cooling fan according to claim 1.

7. An illumination optical system for outputting light from a light source section as predetermined illumination light, said illumination optical system comprising the rotary optical filter apparatus integrated with a cooling fan according to claim 5, and a digital micromirror device irradiated with said luminous flux outputted by said optical filter as being decomposed into said three colors in said time-division manner.

* * * * *